(12) United States Patent
Kutsuzawa

(10) Patent No.: US 8,244,090 B2
(45) Date of Patent: Aug. 14, 2012

(54) CONNECTOR UNIT AND BASE STATION

(75) Inventor: Shuichi Kutsuzawa, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 396 days.

(21) Appl. No.: 12/521,535

(22) PCT Filed: Dec. 21, 2007

(86) PCT No.: PCT/JP2007/074726
§ 371 (c)(1),
(2), (4) Date: Jun. 26, 2009

(87) PCT Pub. No.: WO2008/078705
PCT Pub. Date: Jul. 3, 2008

(65) Prior Publication Data
US 2010/0329622 A1  Dec. 30, 2010

(30) Foreign Application Priority Data
Dec. 27, 2006  (JP) .................................. 2006-353496

(51) Int. Cl.
*G02B 6/00*  (2006.01)
(52) U.S. Cl. ....................................................... 385/135
(58) Field of Classification Search .................. 385/135
See application file for complete search history.

(56) References Cited

U.S. PATENT DOCUMENTS

| | | | |
|---|---|---|---|
| 2006/0153516 A1* | 7/2006 | Napiorkowski et al. | 385/135 |
| 2008/0212967 A1* | 9/2008 | Swam et al. | 398/79 |
| 2008/0285933 A1* | 11/2008 | Vogel et al. | 385/135 |
| 2010/0195968 A1* | 8/2010 | Trebesch et al. | 385/135 |
| 2010/0266237 A1* | 10/2010 | Holmberg et al. | 385/24 |

FOREIGN PATENT DOCUMENTS

| | | |
|---|---|---|
| JP | 04-280203 | 10/1992 |
| JP | 07-046173 | 2/1995 |
| JP | 10-073728 | 3/1998 |
| JP | 10-239533 | 9/1998 |
| JP | 2000-049679 | 2/2000 |
| JP | 2000-049680 | 2/2000 |
| JP | 2001-083333 | 3/2001 |
| JP | 2002-290063 | 10/2002 |
| JP | 2003-195061 | 7/2003 |
| JP | 2005-073366 | 3/2005 |
| JP | 2006-071989 | 3/2006 |

* cited by examiner

*Primary Examiner* — Sung Pak
(74) *Attorney, Agent, or Firm* — DLA Piper LLP (US)

(57) ABSTRACT

A connector unit and a base station that, even when an optical cable is connected, can secure excellent maintainability permitting easy inserting/removing operation for each cable and receive extra length of the optical cable in saved space through efficient arrangement with other parts to thereby attain space saving.

A unit body 21 attached in a housing 11 of a base station 10 is integrally equipped with a first connector 31 for connecting an optical cable 51 and second connectors 32 to 36 for connecting other cables at angles of inclination appropriate for each cable connection, and further the unit body 21 is integrally equipped with a first extra length handling means 41 for receiving extra length of the optical cable 51 so as to attain extra length reception with high space efficiency.

3 Claims, 6 Drawing Sheets

US 8,244,090 B2

CONNECTOR UNIT AND BASE STATION

CROSS-REFERENCE TO THE RELATED APPLICATIONS

This application is a national stage of international application No. PCT/JP2007/074726 filed Dec. 21, 2007, which also claims the benefit of priority under 35 USC 119 to Japanese Patent Application No. 2006-353496 filed Dec. 27, 2006, the entire contents of which are incorporated herein by reference.

TECHNICAL FIELD

The present invention relates to a connector unit and a base station. The connector unit is attached in a housing of the base station for wireless communication terminals and has connectors, to which various types of cables received in the base station is connected.

BACKGROUND ART

FIG. 5 shows a related-art structure for connecting various types of cables within the base station for the wireless communication terminals.

In the shown base station 100, an opening 103 formed in a front surface of a housing 101 which provides the appearance is constituted by an openable cover 102.

Referring to FIG. 5, in a state that the cover 102 is opened, a position confronting with the opening 103 becomes a unit attachment surface 104 equipped within the housing 101, and a connector unit 105 is attached to the unit attachment surface 104.

The connector unit 105, as shown in FIG. 6, is configured to intensively mount various types of connectors 121 to 125, indicating lights 131 to 134 which indicate operating status or connection status of circuits in the base station, and a reset switch 141 and the like, on a unit body 111 openably attached to the unit attachment surface 104.

The connector 121 is a line connector, the connector 122 is a power connector, the connector 123 is a connector for factory inspection, the connector 124 is a maintenance connector, and the connector 126 is an Ethernet (registered trademark) connector.

Also, the indicating light 131 is for Ethernet (registered trademark), the indicating light 132 is for GPS, the indicating light 133 is for operation indication of the base station, and the indicating light 134 is for line received in the base station.

FIG. 5 shows the status that corresponding cables 151, 152 and 153 are connected to the respective connectors 121 to 125 on the connector unit 105.

Each of the cables 151, 152 and 153 connected to the respective connectors 121 to 125 on the connector unit 105 is retained by clamps (cable press) 161, 162 and 163 mounted on the unit attachment surface 104 in the housing 101.

In an example shown in FIG. 5, twisted pair wires are used in the line connection cable 151 which is connected to the line connection connector 121. However, since an optical network has recently been in widespread use, an optical cable is used not a few.

When the optical cable is used, as described in Patent Document 1 and Patent Document 2 below, it is necessary to use extra length receiving means for receiving the extra length of the introduced optical cable, in order to improve maintainability, or not to be subjected to excessive bending.

For the related-art base station 100 as shown in FIG. 5, the connector unit 105 mounted in the housing 101 has no space for mounting the extra length receiving means for receiving the extra length of the optical cable. Therefore, if the optical cable is connected, similar to the clamps 161, 162 and 163 and the like fixing the respective cables 151, 152 and 153, extra length receiving parts for receiving the extra length of the optical cable are additionally mounted on the unit attachment surface 104.

Patent Document 1: Japanese Unexamined Patent Application Publication No. H10-239533
Patent Document 2: Japanese Unexamined Patent Application Publication No. 2001-83333

DISCLOSURE OF THE INVENTION

Problem that the Invention is to Solve

However, the extra length receiving parts to be added in connecting the optical cable have not been designed in consideration of efficient arrangement and the like with other existing parts from the beginning. For this reason, when considering the extra length receiving parts not to interfere in the existing cable clamps or the parts on the connector unit 105, an occurrence of useless void space among the existing parts in a large amount cannot be avoided, and there has arisen a problem that makes a sacrifice of space saving for arrangement of the parts within the base station.

Moreover, the extra length receiving parts to be added cover the connections of other existing cables, whereby it is difficult to perform inserting/removing operation for other cables at the time of maintenance and the like, i.e., maintainability may be deteriorated.

Further, separately from the connector unit 105, there are drawbacks that not only operation of attaching the extra length receiving parts to the housing 101 of the base station is needed, but also the operation of attaching to the housing 101 is increased.

Further, the structures of receiving the extra length of the optical cable as described Patent Document 1 and Patent Document 2 are based on reception of only the optical cable. Therefore, since the structures do not realize connecting the power cable 152 or the Ethernet cable 153 to the connectors, simultaneously with reception of the optical cable, they cannot be diverted to the connector unit 105.

Therefore, an object of the present invention, which relates to solving the above-mentioned problems, is to provide a connector unit and a base station, wherein the connector unit, even in case of an optical cable being connected, is capable of securing excellent maintainability permitting easy inserting/removing operation for each cable without obstruction to inserting/removing operation for other cables by the means for receiving extra length of the optical cable covering connections of the other cables, and capable of effectively arranging the extra length of the optical cable in close proximity to other parts, to thereby attain space saving for arrangement of the parts within the base station. Another object of the present invention is to provide a connector unit and a base station to be capable of preventing operation of attaching to a housing of the base station from being increased.

Means for Solving the Problem

To solve the problem, a connector unit according to the present invention includes: a unit body to be attached in a housing of a base station, and extra length handling means which is coupled to or integrally formed on the unit body to receive extra length of cables connected to connectors on the unit body, and is characterized in that the unit body is integrally equipped with a first connector for connecting an optical cable and a second connector for connecting a cable other than the optical cable at inclination angles depending on the respective cables, and that the extra length handling means is constituted to be dependent on bending properties of the cables to be received and the inclination angles of the connectors on the corresponding unit body.

According to the above-mentioned constitution, in consideration of even the case of the optical cable being connected onto the unit body beforehand, directions or layouts of the connectors for connecting each cable, and positions for receiving the extra length of each cable may be established.

Therefore, directions, layouts and sizes and the like of each part can be established in due consideration of not obstructing inserting/removing operation for each cable by the extra length of the optical cable covering the upper side of connectors of the other cables, and extra length handling means for receiving the extra length of each cable not leaving useless void space among the other parts.

This is, even in case of the optical cable being connected, there can be secured excellent maintainability permitting easy inserting/removing operation for each cable without obstruction to inserting/removing operation for other cables by extra length handling means for receiving the extra length of the optical cable covering connections of the other cables.

Furthermore, the extra length of the optical cable uses the extra length handling means which has been designed in consideration of bending property of the optical cable and the inserting/removing angle of the first connector, therefore the extra length of the optical cable can be effectively arranged in close proximity to other parts, to thereby attain space saving for arrangement of the parts within the base station.

Further, since the extra length handling means is integrally equipped in the unit body, operation of attaching to the housing of the base station has only to perform operation of attaching the unit body, and the extra length handling means can prevent operation of attaching to the housing of the base station from being increased.

Further, the connector unit according to the present invention is characterized in that as the extra length handling means, first extra length handling means for receiving the extra length of the optical cable connected to the first connector, and second extra length handling means for receiving the extra length of the cable connected to the second connector are individually prepared depending respectively on bending properties of the corresponding cables and the inclination angles of the corresponding connectors, and that any one of the first extra length handling means and the second extra length handling means is selected and attached depending on which of the first connector and the second connector on the unit body is used.

According to this constitution, in case of an optical cable being connected, the second extra length handling means is attached to the unit body in place of the first extra length handling means, whereby for example, a step of receiving the extra length of twisted pair cables and the like connected to the line connector is performed in the second extra length handling means. Therefore, it is unnecessary to use the clamps and the like equipped in the housing of the base station. In addition, even in case of no optical cable being connected, operation of attaching to the housing of the base station can be improved, or a step of handling the extra length of the cables can be performed at high packaging density without any damage to inserting/removing properties of the cables at the time of maintenance.

A base station according to the present invention has a connector unit within a housing thereof, the connector unit including: a unit body attached to the housing, and an extra length handling means which is coupled to or integrally formed on the unit body to receive the extra length of cables connected to connectors on the unit body, and is characterized in that the unit body is integrally equipped with a first connector for connecting an optical cable and a second connector for connecting a cable other than the optical cable at inclination angles depending on the respective cables, and that the extra length handling means is constituted to be dependent on bending properties of the cables to be received and the inclination angles of the connectors on the corresponding unit body.

According to the above base station, even in case of the optical cable being connected, there can be secured excellent maintainability permitting easy inserting/removing operation for each cable without obstruction to inserting/removing operation for other cables by extra length handling means for receiving the extra length of the optical cable covering connections of other cables.

Further, since the extra length of the optical cable can be effectively arranged in close proximity to other parts, there can be attained space saving for arrangement of the parts within the base station.

Still further, since the extra length handling means is integrally equipped in the unit body, the extra length handling means can prevent operation of attaching to the housing of the base station from being increased.

Further, the base station according to the present invention is characterized in that as the extra length handling means, first extra length handling means for receiving the extra length of the optical cable connected to the first connector, and second extra length handling means for receiving the extra length of the cable connected to the second connector are individually prepared depending respectively on bending properties of the corresponding cables and the inclination angles of the corresponding connectors, and that any one of the first extra length handling means and the second extra length handling means is selected and attached depending on which of the first connector and the second connector on the unit body is used.

According to the above base station, in case of no optical cable being connected, the second extra length handling means is attached to the unit body in place of the first extra length handling means, whereby for example, a step of receiving the extra length of twisted pair cables and the like connected to the line connector is performed in the second extra length handling means. Therefore, it is unnecessary to use the clamps and the like equipped in the housing. In addition, even in case of no optical cable being connected, operation of attaching to the housing can be improved, or a step of handling the extra length of the cables can be performed at high packaging density without any damage to inserting/removing properties of the cables at the time of maintenance.

Advantages of the Invention

In the connector unit according to the invention, even in case of the optical cable being connected, there can be secured excellent maintainability permitting easy inserting/removing operation for each cable without obstruction to inserting/removing operation for other cables by the means for receiving the extra length of the optical cable. In addition, the extra length of the optical cable can be effectively arranged in close proximity to other parts, to thereby attain space saving for arrangement of the parts within the base station. Further, the connector unit can prevent operation of attaching to the housing of the base station from being increased.

Figure 1:
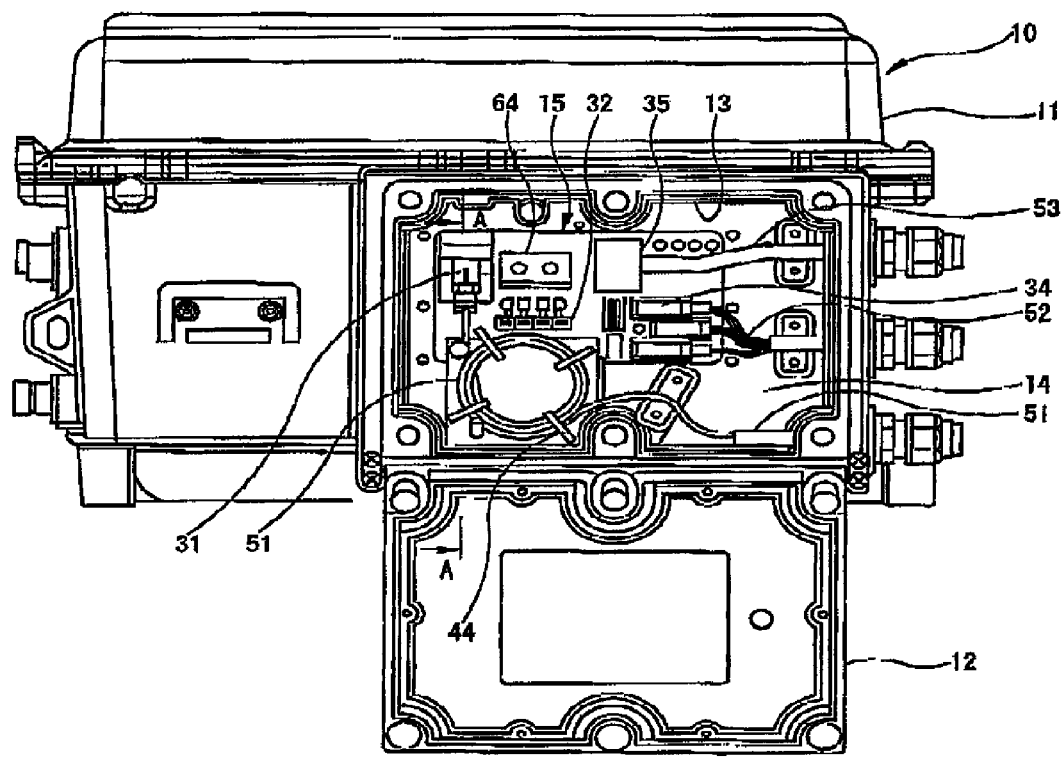
FIG. 1 is a front elevation view of an embodiment of a base station to which a connector unit according to the invention is attached.

DESCRIPTION OF REFERENCE NUMERALS AND SIGNS 10, 100: BASE STATION
11, 101: HOUSING
12: COVER
13: OPENING
14: UNIT ATTACHMENT SURFACE
15, 105: CONNECTOR UNIT
21: UNIT BODY
31: FIRST CONNECTOR
32 TO 36: SECOND CONNECTOR
41: FIRST EXTRA LENGTH HANDLING MEANS
42: SECOND EXTRA LENGTH HANDLING MEANS
43: EXTRA LENGTH RECEIVING TRAY
44: CABLE GUIDE
45: ATTACHMENT SEGMENT
46: VERTICAL WALL
47: CABLE PLACEMENT PORTION
48: EXTRA LENGTH RECEIVING TRAY
51: OPTICAL CABLE
54: LINE CABLE

BEST MODE FOR CARRYING OUT THE INVENTION

Figure 2:
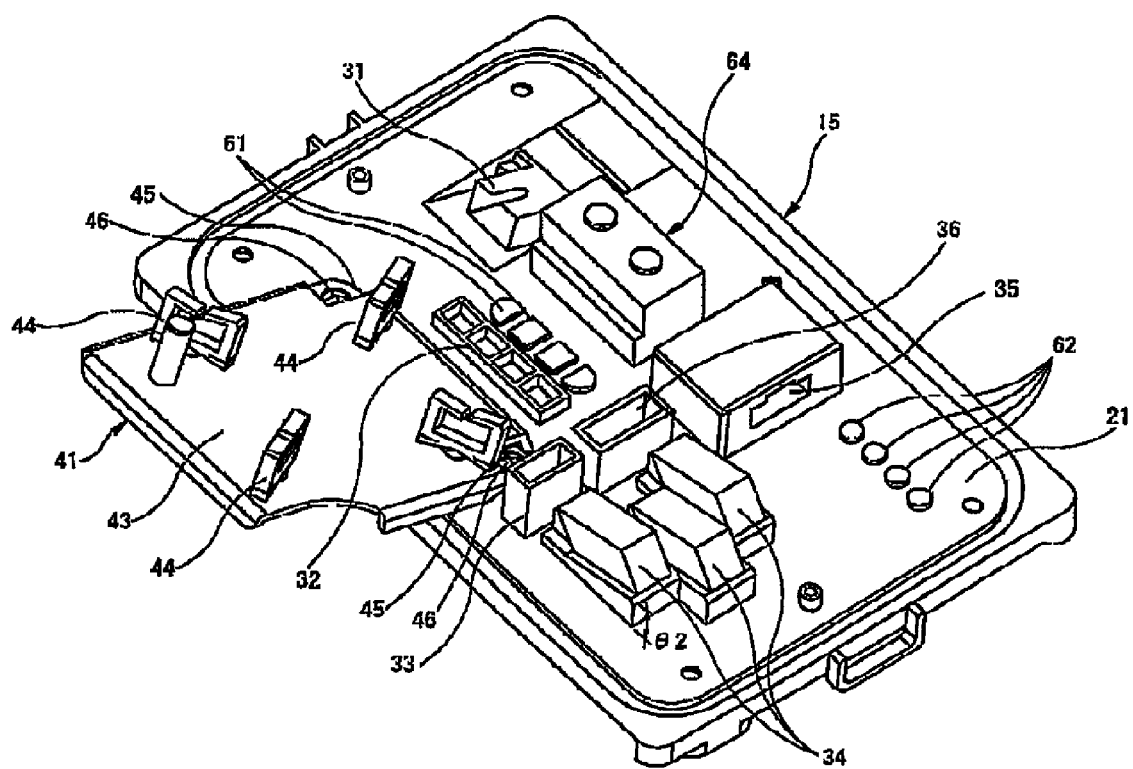
FIG. 2 is an enlarged perspective view of the connector unit shown in FIG. 1.
Figure 3:
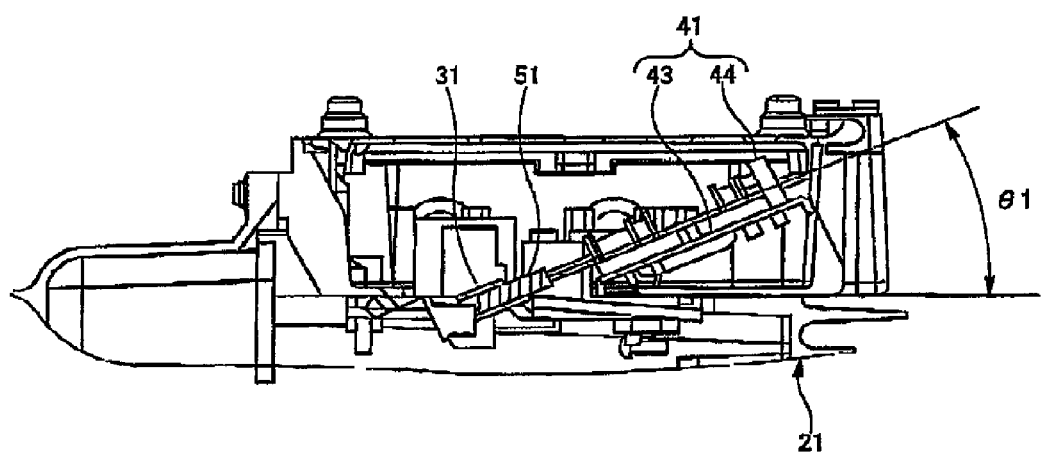
FIG. 3 is a cross-sectional view taken along the line A-A of FIG. 1.
Figure 4:
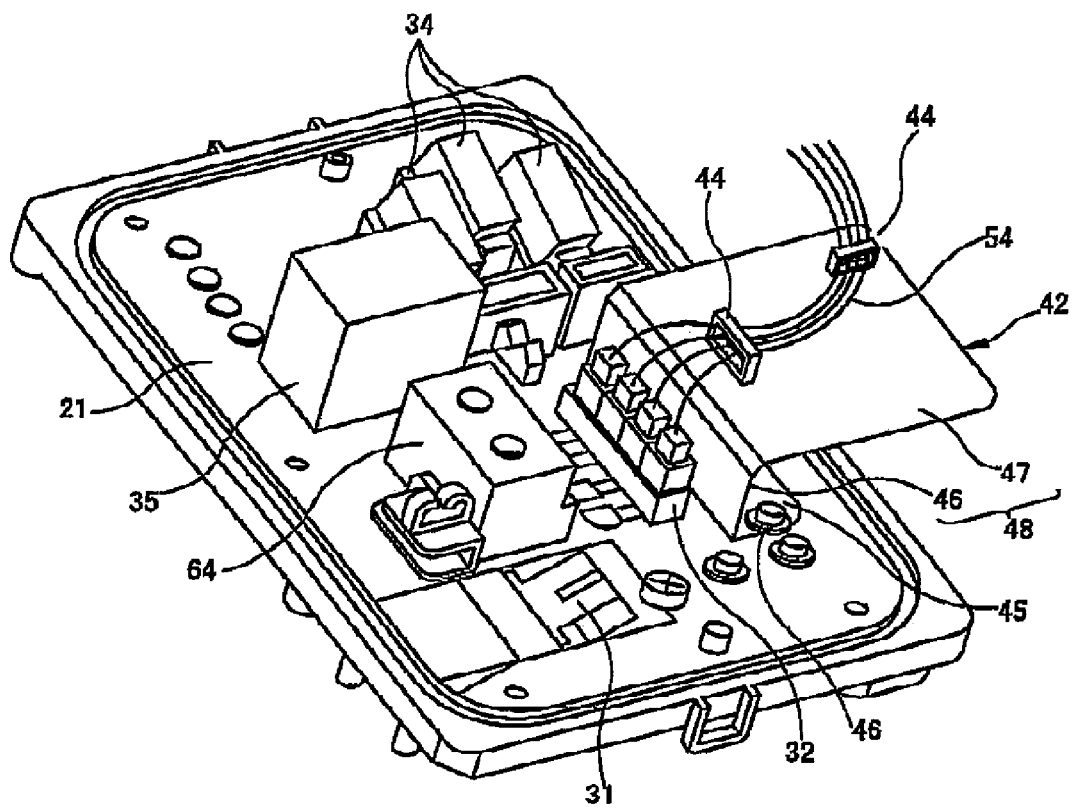
FIG. 4 is a perspective view of a state that second extra length handling means is attached to the connector unit shown in FIG. 2.
Figure 5:
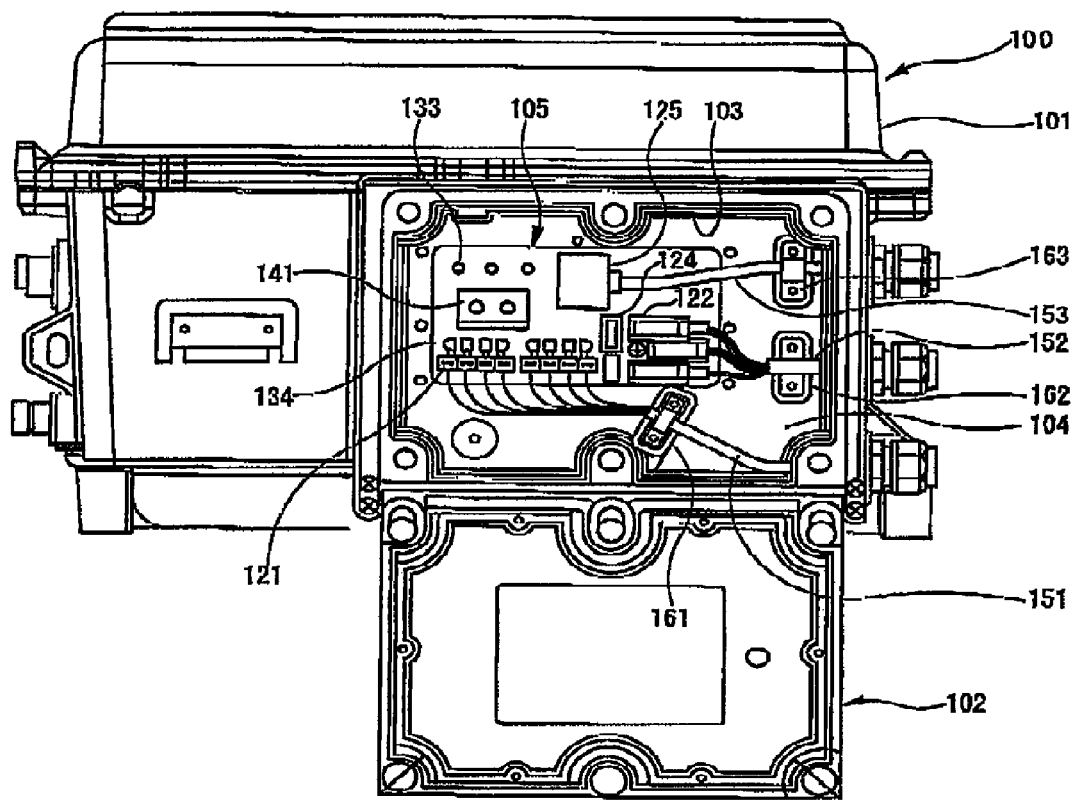
FIG. 5 is a front elevation view of a base station to which a related-art connector unit is attached.
Figure 6:
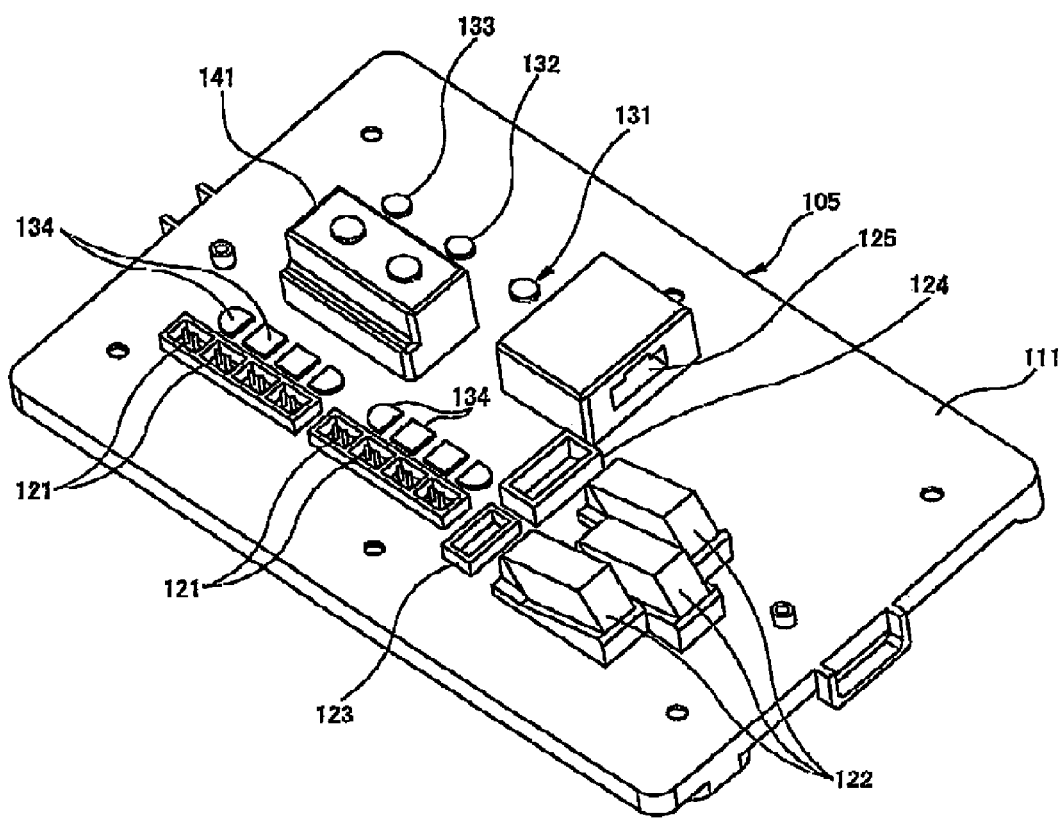
FIG. 6 is an enlarged perspective view of the connector unit shown in FIG. 5.

Hereinafter, reference is made to the drawings to describe preferred embodiments of a connector unit and a base station according to the invention.
FIG. 1 is a front elevation view of an embodiment of a base station to which a connector unit according to the invention is attached; FIG. 2 is an enlarged perspective view of the connector unit shown in FIG. 1; FIG. 3 is a cross-sectional view taken along the line A-A of FIG. 1; and FIG. 4 is a perspective view of a state that second extra length handling means is attached to the connector unit shown in FIG. 2.
A base station 10 shown in FIG. 1 is a base station which connects lines to wireless communication terminals such as a PHS or a cellular phone, wherein an opening 13 formed in a front surface of a housing 11 which provides the appearance is configured to be openable by an openable cover 12.
Referring to FIG. 1, in a state that the cover 12 is opened, a position confronting with the opening 13 becomes a unit attachment surface 14 equipped within the housing 11, and a connector unit 15 according to the invention is attached to the unit attachment surface 14.

The connector unit 15, as shown in FIG. 2 to FIG. 4, includes a unit body 21 attached to the unit attachment surface 14, and first and second extra length handling means 41 and 42 which are coupled to or integrally formed on the unit body 21 to receive the extra length of cables connected to connectors on the unit body 21.
The unit body 21 is integrally equipped with a first connector 31 for connecting an optical cable 51, and multiple types of second connectors 32 to 36 for connecting the other cables 52, 53 and 54 having bending properties or connection structures different from that of the optical cable 51, at angles of inclination easy to connect the respective corresponding cables.
As the first connector 31 for connecting the optical cable 51, for example, an SC connector is adopted.
The second connectors 32 to 36 are used for connecting cables other than the optical cables such as twisted pair cables or coaxial shielded cables. In explanation of each of the connectors corresponding to the second connectors 32 to 36, the connector 32 is a line connector which connects a line cable 54 (see FIG. 4) using twisted pair cables, the connector 38 is a connector for factory inspection, the connector 34 is a power connector for connecting a power cable 52, the connector 35 is an Ethernet (registered trademark) connector for connecting an Ethernet (registered trademark) cable 53, the connector 36 is a maintenance connector for connecting cables of testing equipment at the time of maintenance.
In each of the connectors 31 to 36, in consideration of bending properties of the cables connected to each one and connection structures of the connectors, angles thereof on the unit body 21 are set up to perform easy inserting/removing operation of the cables.
The first connector 31 is equipped at an inclination angle of θ1 as shown in FIG. 3. θ1 is set up at about 25 degrees.
The power connector 34 is also equipped at an inclination angle of θ2 in consideration of inserting/removing properties of the cables as shown in FIG. 2. The inclination angles of θ2 is set up within the range of 15 to 25 degrees.
The line connector 32, the factory inspection connector 33, and the maintenance connector 36 are equipped so that inserting/removing directions thereof are substantially 90 degrees with respect to the surface of the unit body 21.
Further, the Ethernet (registered trademark) connector 35 is equipped so that its inserting/removing direction is in parallel to the surface of the unit body 21, at a height away from the surface of the unit body 21 by a predetermined distance.
In addition to the connectors 31 to 36 as described above, indicating lights 61 and 62 which indicate the operating status of circuits or the connection status of cables in the base station, or a reset switch 64 are equipped on the unit body 21.
The indicating lights 61 and 62 each use an LED, the indicating light 61 is for a line received in the base station, and the indicating light 62 is for indicating a status.
The first extra length handling means 41, which is extra length handling means for receiving the extra length of the optical cable 51 connected to the first connector 31, includes an extra length receiving tray 43 which places extra length portions of the optical cable 51 in a circling state with a curvature radius equal to or greater than an allowable bending radius of the optical cable 51, and cable guides 44 for position regulating the optical cable 51 mounted on the extra length receiving tray 43 and placed in a circling state.
As shown in FIG. 1 and FIG. 2, an attachment segment 45 to be screwed to the unit body 21 is integrally formed on the extra length receiving tray 43. Therefore, the first extra length handling means 41 is detachably integrated into the unit body 21 with a screw 46.

When the extra length receiving tray 43 is fixed to the unit body 21, the extra length receiving tray 43 forms an inclination angle substantially equal to that of the first connector 31 as shown in FIG. 3.

As shown in FIG. 4, since the extra length of the line cable 54 is received when the line cable 54 is connected to the line connector 32, the second extra length handling means 42 is designed separately from the first extra length handling means 41, in consideration of the inclination angle of the line connector 32 corresponding to the bending property of the line cable 54.

The second extra length handling means 42 includes an extra length receiving tray 48 which integrally forms a vertical wall 46 standing up from a position adjacent to the line connector 32 and a cable placement portion 47 extending substantially horizontally from an upper end of the vertical wall 46, and the cable guides 44 for position regulating the line cable 54 mounted on the extra length receiving tray 48 and connected to the line connector 32.

The attachment segment 45 to be screwed to the unit body 21 is integrally formed on the vertical wall 46. Therefore, the second extra length handling means 42 is detachably integrated into the unit body 21 with a screw 46.

The first extra length handling means 41 and the second extra length handling means 42 mentioned above are designed respectively for the exclusive use in order that occupied space in the housing 11 becomes small, in consideration of bending properties of the cables to be received and inclination angles of the connectors on the corresponding unit body 21. However, since attachment positions for the unit body 21 are in common, only one of the first extra length handling means 41 and the second extra length handling means 42 is selected to use, depending on whether the optical cable 51 is connected or not.

According to the above-mentioned constitution, in consideration of even the case of the optical cable 51 being connected onto the unit body 21 beforehand, directions or layouts of the connectors 31 to 36 for connecting each cable, and positions for receiving the extra length of each cable may be established.

Therefore, even in case of the optical cable 51 being connected, directions, layouts and sizes and the like of each part can be established in due consideration of not obstructing inserting/removing operation for each cable by the extra length of the optical cable 51 covering the upper sides of the second connectors 32 to 36 for the other cables, and the first extra length handling means 41 for receiving the extra length of the optical cable 51 not leaving useless void space among the other parts.

This is, even in case of the optical cable 51 being connected, as shown in FIG. 1, there can be secured excellent maintainability permitting easy inserting/removing operation for each cable without obstruction to inserting/removing operation for other cables by the first extra length handling means 41 for receiving the extra length of the optical cable 51 covering connections of the other cables.

Furthermore, the extra length of the optical cable 51 uses the first extra length handling means 41 which is designed in consideration of the bending property of the optical cable 51 and the inserting/removing angle of the first connector 31, therefore the extra length of the optical cable 51 can be effectively arranged in close proximity to other parts, to thereby attain space saving for arrangement of the parts within the base station 10.

Further, since the extra length handling means 41 and 42 are integrally equipped in the unit body 21, operation of attaching to the housing 11 of the base station has only to perform operation of attaching the unit body 21, and the extra length handling means can prevent operation of attaching to the housing 11 of the base station from being increased.

Moreover, as shown in FIG. 4, in case of no optical cable 51 being connected, the second extra length handling means 42 is attached to the unit body 21 in place of the first extra length handling means 41, whereby for example, a step of receiving the extra length of twisted pair cables and the like connected to the line connector 32 is performed in the second extra length handling means 42. Therefore, it is not necessary to use the clamps and the like equipped in the housing 11 of the base station. In addition, even in case of no optical cable 51 being connected, operation of attaching to the housing 11 of the base station can be improved, or a step of handling the extra length of the cables can be performed at high packaging density without any damage to inserting/removing properties of the cables at the time of maintenance.

In addition, in the above embodiment, two extra length handling means 41 and 42 are prepared beforehand, and then when the optical cable 51 is connected to the connector unit 15, the first extra length handling means 41 is selected and used, and otherwise the second extra length handling means 42 is selected and used. However, when the cables other than the optical cable 51 are used, a need for receiving the extra length, in general, is not high as compared to the optical cable.

Therefore, the first extra length handling means 41 is only prepared, and then only when the optical cable is connected, it may be used in the state that the extra length handling means is attached to the unit body 21.

Additionally, in the embodiments, although the extra length handling means 41 and 42 are configured to be detachable to the unit body 21 by screw cramping, they may be integrally formed on the unit body 21 by injection molding and the like.

The invention claimed is:

1. A connector unit, comprising:
   a unit body to be attached in a housing of a base station, and
   an extra length handling unit which is coupled to or integrally formed on the unit body to receive extra length of a cable connected to a connector on the unit body,
   wherein the unit body is integrally equipped with: a first connector to be connected to an optical cable; and a second connector to be connected to an electric cable other than the optical cable, at inclination angles depending on the respective cables,
   wherein the first connector is provided in a first direction and the second connector is provided in a second direction, which is different from the first direction,
   wherein the extra length handling unit is configured by either a first extra length handling unit for receiving the extra length of the optical cable connected to the first connector or a second extra length handling unit for receiving the extra length of the electric cable connected to the second connector,
   wherein, when the first connector is used, the extra length handling unit is configured by the first extra length handling unit that is provided in the first direction, and
   wherein, when the second connector is used, the extra length handling unit is configured by the second extra length handling unit that is provided in the second direction.

2. A base station having a connector unit within a housing thereof, the connector unit comprising:
   a unit body attached to the housing, and
   an extra length handling unit which is coupled to or integrally formed on the unit body to receive extra length of a cable connected to a connector on the unit body, wherein the unit body is integrally equipped with: a first connector to be connected to an optical cable; and a second connector to be connected to an electric cable other than the optical cable, at inclination angles depending on the respective cables, wherein the first connector is provided in a first direction and the second connector is provided in a second direction, which is different from the first direction, wherein the extra length handling unit is configured by either a first extra length handling unit for receiving the extra length of the optical cable connected to the first connector or a second extra length handling unit for receiving the extra length of the electric cable connected to the second connector, wherein, when the first connector is used, the extra length handling unit is configured by the first extra length handling unit that is provided in the first direction, and wherein, when the second connector is used, the extra length handling unit is configured by the second extra length handling unit that is provided in the second direction.

3. A connector unit, comprising:

a unit body to be attached in a housing, wherein the unit body is integrally equipped with: a first connector to be connected to an optical cable; and a second connector to be connected to an electric cable other than the optical cable, at inclination angles depending on the respective cables, wherein the first connector is provided in a first direction and the second connector is provided in a second direction, which is different from the first direction, wherein the unit body is configured to be coupled with either:
  a first extra length handling unit, which receives the extra length of the optical cable connected to the first connector, and which is provided in the first direction; or
  a second extra length handling unit, which received the extra length of the electric cable connected to the second connector, and which is provided in the second direction.

* * * * *